UNITED STATES PATENT OFFICE.

DAVID R. CASTLEMAN, OF LOUISVILLE, KENTUCKY.

FERTILIZER.

SPECIFICATION forming part of Letters Patent No. 292,470, dated January 29, 1884.

Application filed June 18, 1883. (No specimens.)

*To all whom it may concern:*

Be it known that I, DAVID R. CASTLEMAN, a citizen of the United States, residing at Louisville, in the county of Jefferson and State of Kentucky, have invented a certain new and useful Improvement in Fertilizers; and I do hereby declare that the following is a full, clear, and exact description of the composition and the manner of preparing the same, to be used for the purpose of improving the soil preparatory to planting, of which the following is a specification.

This my invention or composition of matter consists of the following ingredients, in their several proportions, as follows: leaf-tobacco stems, fifty pounds; prepared phosphate, fifty pounds. In order to prepare and properly compound these ingredients, I take, first, the stems of leaf-tobacco and subject them to a thorough drying process, after which I place them in a suitable mill and grind them until thoroughly pulverized, after which I then add thereto the required amount of phosphates—such as bone, Charleston rock, or any others suitable for the purpose—and after mixing them thoroughly the compound is ready for use. These ingredients may be ground in the mill together, and may be used in the proportions above described, or may be varied to suit the particular purpose for which they are intended to be used, and may be applied in any manner most suitable to the planter.

By the use of this my composition the soil will be greatly improved when applied as a general fertilizer, or in ordinary planting; therefore

What I claim, and desire to secure by Letters Patent, is—

The herein-described composition of matter, to be used as a fertilizer for the soil, to assist the growth of plants and other agricultural products, consisting of pulverized or ground tobacco-stems and any of the ordinary phosphates now in use, in the proportions above specified.

DAVID R. CASTLEMAN.

Witnesses:
 FRANK PARDON,
 GEO. D. LEE.